United States Patent
Heuts et al.

(10) Patent No.: US 11,044,257 B1
(45) Date of Patent: Jun. 22, 2021

(54) ONE-TIME ACCESS TO PROTECTED RESOURCES

(71) Applicant: Amazon Technologies, Inc., Seattle, WA (US)

(72) Inventors: Robert Paul Heuts, Bellevue, WA (US); Shufan Kang, Bellevue, WA (US); Daniel Allen Green, Seattle, WA (US); Nikhil Swaminathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 16/200,361

(22) Filed: Nov. 26, 2018

(51) Int. Cl.
*H04L 29/06* (2006.01)
*G06F 9/455* (2018.01)

(52) U.S. Cl.
CPC ........ *H04L 63/108* (2013.01); *G06F 9/45558* (2013.01); *H04L 63/0807* (2013.01); *G06F 2009/45587* (2013.01)

(58) Field of Classification Search
CPC .............. H04L 63/108; H04L 63/0807; G06F 9/45558
See application file for complete search history.

(56) References Cited

U.S. PATENT DOCUMENTS

| | | | | |
|---|---|---|---|---|
| 9,270,703 B1 * | 2/2016 | Clough | .................... | H04L 63/20 |
| 10,044,808 B2 * | 8/2018 | Yendluri | .................. | H04L 67/14 |
| 10,102,305 B1 * | 10/2018 | Chang | .................... | G06F 16/957 |
| 2013/0297922 A1 * | 11/2013 | Friedman | ................... | G06F 8/63 |
| | | | | 713/2 |
| 2014/0298091 A1 * | 10/2014 | Carlen | ....................... | G06F 9/54 |
| | | | | 714/15 |
| 2014/0317701 A1 * | 10/2014 | Eicken | ................... | H04L 63/102 |
| | | | | 726/5 |
| 2015/0121483 A1 * | 4/2015 | Perez | ...................... | H04L 41/50 |
| | | | | 726/5 |
| 2015/0222604 A1 * | 8/2015 | Ylonen | ................... | H04L 63/10 |
| | | | | 713/171 |
| 2015/0304294 A1 * | 10/2015 | Roth | ........................ | G06F 21/62 |
| | | | | 726/4 |
| 2016/0119306 A1 * | 4/2016 | Matthews | ................ | H04L 63/08 |
| | | | | 726/6 |
| 2017/0060613 A1 * | 3/2017 | Warkentin | ........... | G06F 9/45545 |
| 2018/0082053 A1 * | 3/2018 | Brown | ..................... | G06F 21/57 |

(Continued)

*Primary Examiner* — Jason Chiang
(74) *Attorney, Agent, or Firm* — Nicholson De Vos Webster & Elliott LLP

(57) ABSTRACT

A technology is described for one-time access to a protected resource. In one example, a resource security API (Application Programming Interface) may receive a request for a protected resource. The request may be associated with a launch of a software container in a service provider environment to host a process associated with a customer account. The resource security API may identify a single-use token linked to the software container that allows the resource security API to provide the protected resource. The resource security API may send the protected resource to the software container in response to the request when the single-use token is identified, and the resource security API may disable the single-use token linked to the software container to prevent additional requests associated with the software container from accessing the protected resource.

21 Claims, 7 Drawing Sheets

(56) References Cited

U.S. PATENT DOCUMENTS

| | | | | |
|---|---|---|---|---|
| 2018/0146056 A1* | 5/2018 | Eberlein | ............. | H04L 67/2809 |
| 2019/0356494 A1* | 11/2019 | Chmara | .................. | G06F 21/44 |
| 2019/0379590 A1* | 12/2019 | Rimar | ................... | H04L 43/045 |
| 2020/0082071 A1* | 3/2020 | Cherny | ................... | G06F 21/45 |

\* cited by examiner

ONE-TIME ACCESS TO PROTECTED RESOURCES

BACKGROUND

Virtualization technologies for computing resources have provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more virtualized compute resources (e.g., computing instances and software containers) hosted by the single physical computing machine using a hypervisor. A virtualized compute resource may be configured to obtain various resources or services via APIs that provide access to the resources and services.

An application programming interface (API) may be a programmatic interface that exposes services at one or more accessible endpoints using a defined request-response message system. For example, an API may provide a set of defined methods to allow components of a system to request resources from an endpoint. Illustratively, an API can be capable of receiving JavaScript Object Notation (JSON) or extensible markup language (XML), and the API may be exposed to clients using an HTTP-based web server. Endpoints accessible via an API may provide access to resources (e.g., data and services) via the API requests. Typically, access to a resource is accomplished via a uniform resource identifier (URI), to which HTTP requests are posted, and from which, a response to the request may be received.

DETAILED DESCRIPTION

Figure 1:
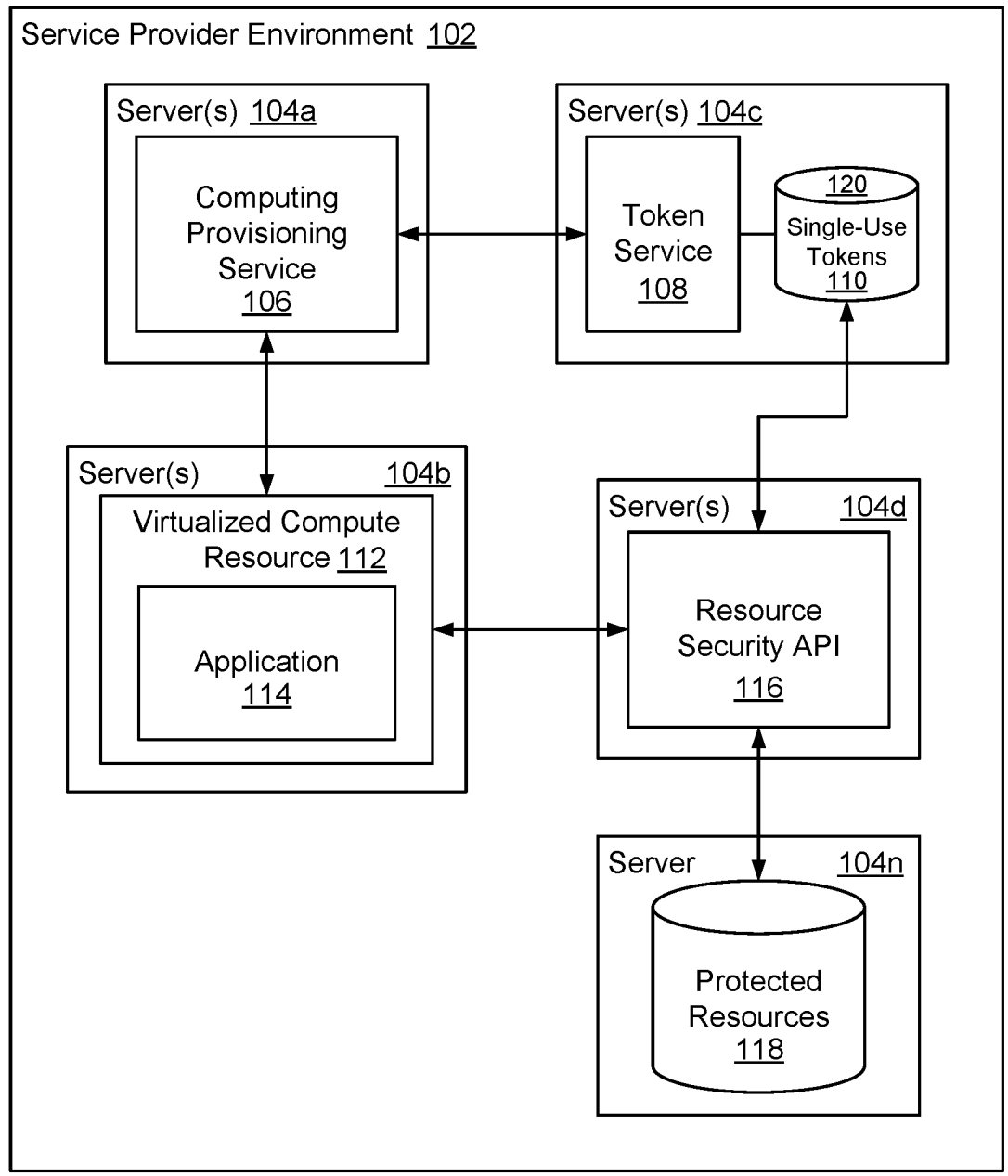
FIG. 1 is a block diagram illustrating an example system for providing one-time access to a protected resource via a resource security application programming interface (API) and a single-use token.

A technology is described for securing a protected resource using a resource security application programming interface (API) configured to allow one-time access to the protected resource. In one example, a single-use token representing authorization to access a protected resource may be generated and the single-use token may be provided to a computing entity associated with an account to enable the computing entity to access the protected resource through a request to the resource security API. The resource security API may be configured to validate a single-use token in response to a request to access a protected resource and provide access to the protected resource. After providing access to the protected resource, the resource security API may be configured to disable the single-use token to prevent the computing entity from making additional requests for the protected resource using the single-use token. A protected resource may include any electronic resource that may be associated with a computing entity, including, but not limited to: databases, data objects, security credentials, accounts, personally identifiable information, services, and the like.

In one example of the technology, the resource security API may be used to provide a first account (e.g., a service provider account) with one-time access to protected data associated with a second account (e.g., a customer or tenant account). As an example, a computing service provider may provide customers with virtualized compute resources (e.g., computing instances and software containers) which can be used to host customer applications. As part of launching a virtualized compute resource to host a customer application, a token service may generate a single-use token to allow an application build process executed under a service provider account to obtain protected customer credentials via a request to the resource security API. In response to a request from the application build process executed in the software container or computing instance, the resource security API may validate the single-use token and provide the customer credentials to the application build process. Thereafter, the resource security API may disable the single-use token to prevent additional requests (e.g., associated with the application build process) from obtaining the customer credentials. After obtaining the customer credentials, the application build process may set one or more environment variables to the customer credentials to allow the customer application to reference the environment variables and access backend application resources, such as data stores and managed services used by the customer application.

In another example of the technology, the resource security API may be used to perform a one-time write of data to a protected resource, such as a log file, database, etc. As an example, as part of launching a virtualized compute resource to host a customer application or process, a token service may generate a single-use token that allows the customer application to perform a one-time write of data to a protected resource associated with another account, such as a service provider account or a third-party account. For example, after instantiating the application in the virtualized compute resource, the application may be configured to write metrics to a metrics log owned by the service provider account. The application may be configured to submit the metrics to the resource security API with a request to write the metrics to the metrics log, and in response to the request, the resource security API may validate the single-use token and write the metrics to the metrics log. Thereafter, the resource security API may disable the single-use token to prevent additional requests associated with the application from writing to the metrics log.

The present technology provides benefits associated with securing a protected resource for one-time use by a computing entity associated with an account using a single-use token or single use API to allow the computing entity one-time access to the protected resource and then prevent the computing entity from having continued access to the protected resource. A challenge related to data security is conflict of access situations where a first computing entity associated with an account needs access to a protected resource associated with a second computing entity associated with a different account. For example, a computing service provider may need the ability to retrieve a customer's credentials in order to set up an execution environment for the customer's application. However, granting the computing service provider access to the customer's protected data in order to retrieve the customer's credentials may violate data security policies. As another example, a service provider may want to allow a customer application to write startup metrics to a metrics log, but prohibit the customer application from accessing the metrics log thereafter. The present technology can be used to overcome the types of problems described above. In particular, as described herein, a single-use token can be generated to allow a first computing entity to request a protected resource associated with a second computing entity from a resource security API that validates the single-use token, provides the protected resource to the first computing entity, and disables the single-use token to prevent additional use of the single-use token. Moreover, the present technology allows an account owned by the service provider to instantiate a virtual compute resource (e.g., a container or a computing instance) within a service provider environment and then access and load protected resources into the virtual compute resource using a single-use token and a resource security API. Then if a customer account that will be using the virtual compute resource makes attempts to re-access the protected resource via the resource security API, those attempts will fail because the single-use token is deactivated or deleted, as described earlier. Thus, protected resources such as credentials or other account specific resources may be loaded into a virtual compute resource created for another account without creating a significant security risk. Consequently, the present technology provides improvements to data security by using a resource security API and a single-use token to secure a protected resource for one-time access by a non-owning computing entity.

To further describe the present technology, examples are now provided with reference to the figures. FIG. 1 is a diagram illustrating a high-level example of a system 100 in accordance with one example of the present technology. As illustrated, the system 100 may be implemented using a service provider environment 102 that includes computing resources for executing various components of the system 100. The service provider environment 102 may provide shared configurable computing resources and services in the service provider environment 102 may be provisioned and scaled for use by service provider customers. The computing resources in the service provider environment 102 may include a plurality of physical servers 104a-n that host the components of the system 100.

A server 104d may host a resource security API 116 configured to provide one-time access to protected resources 118 using a single-use token 110. The resource security API 116 may be a programmatic interface that exposes resources in a server 104n to computing entities (e.g., a virtualized compute resource 112 or application 114) associated with an account included in the system 100. The server 104n may host protected resources 118, and the resource security API 116 may provide access to the protected resources 118 after validating a single-use token 110 issued to a computing entity requesting the protected resource 118. For example, as described in greater detail below, a token service 108 may generate a single-use token 110, in response to a request from a computing provisioning service 106, which may be issued to a virtualized compute resource 112 to allow access to the protected resource 118.

In one example, providing access to a protected resource 118 may include providing the protected resource 118 (e.g., credentials, personally identifiable information, account information, etc.) to the computing entity that requested the protected resource 118. In another example, providing access to a protected resource 118 may include writing data (e.g., resource launch metrics, resource registration information, or resource environment information, etc.) to a protected resource 118. A protected resource 118 may include any kind of electronic resource, including, but not limited to, a data store, a document, a file, software, service, credentials, personally identifiable information, account information, etc. A computing entity (e.g., a computing resource associated with an account) may be granted one-time access to a protected resource 118 by issuing the computing entity a single-use token 110 that allows the computing entity to request access to the protected resource 118 via an API request sent to the resource security API 116.

After providing access to a protected resource 118, the resource security API 116 may disable a single-use token 110 to prevent additional requests from accessing the protected resource 118. In one example, the single-use token 110 may be deleted from a token data store 120 used to store single-use tokens 110. In another example, the resource security API 116 may flag a single-use token 110 as having been used to access a protected resource 118.

In a related example, a single-use token 110 may expire, such that if the single-use token 110 has not been used within a defined time (e.g., a set number of milliseconds, a day and time, an average time to implement an application 114 in a virtualized compute resource 112, etc.), the single-use token 110 may become invalid and cannot be used by a computing entity to access a protected resource 118. In the case that the single-use token 110 is used prior to expiring, the resource security API 116 may disable the single-use token 110 to prevent the single-use token 110 from being used a second time to access a protected resource 118.

A server 104c may host a token service 108 configured to generate a single-use token 110 used to provide one-time access to a protected resource 118. A single-use token 110 may represent authorization for a computing entity (e.g., a computing resource associated with an account) to access a protected resource 118. In one example, the token service 108 may generate a single-use token 110 and link the single-use token 110 to a computing entity, granting the computing entity one-time access to a protected resource 118. For example, a single-use token 110 may be linked to a specific computing resource (e.g., a virtualized compute resource 112, an application 114, a client, etc.) and/or account (e.g., a service provider account or a customer account). Linking a single-use token 110 to a specific computing entity may prevent other entities from using the single-use token 110 to gain access to a protected resource 118. As an example, a single-use token 110 may be generated to include a resource identifier for a virtualized compute resource 112 and the single-use token 110 may be stored to a token data store 120, as described below. The virtualized compute resource 112 may send an API request to the resource security API 116 requesting access to a protected resource 118. The API request may include the resource identifier for the virtualized compute resource 112. The resource security API 116 may validate the API request by identifying the single-use token 110 that includes the resource identifier for the virtualized compute resource 112. After validating the API request using the single-use token 110, the resource security API 116 may allow the virtualized compute resource 112 to access the protected resource 118, and the resource security API 116 may disable the single-use token 110 by deleting the single-use token 110 from the token data store 120.

A single-use token 110 generated by the token service 108 may be stored to a token data store 120. When validating the single-use token 110, the resource security API 116 may query the token data store 120 to determine whether the single-use token 110 exists. For example, in response to a request for a protected resource 118, the resource security API 116 may query the token data store 120 using a resource identifier and/or an account identifier to determine whether a single-use token 110 linked to a computing resource and/or an account associated with the request is stored in the token data store 120. If the token data store 120 includes a single-use token (or has an active single-use token that has not been marked as being used) linked to the computing resource and/or account, then the resource security API 116 may provide access to the protected resource 118. However, if the token data store 120 does not contain a single-use token linked to the computing resource and/or account, then the request is denied, preventing a computing entity associated with the resource identifier and/or account identifier from accessing the protected resource 118.

In an alternative example, the token service 108 may generate a single-use token 110 and the single-use token 110 may be provided to a computing entity (e.g., a virtualized compute resource 112 associated with an account). An API request to access a protected resource 118 sent by the computing entity may include the single-use token 110. In response to receiving the request, the resource security API 116 may validate the single-use token 110 (e.g., via a token registry, asymmetric-key, digital certificate, or identity certificate, etc.) and provide the computing entity access to the protected resource 118. Thereafter, the single-use token 110 may be disabled (e.g., deleted) to prevent the computing entity from using the single-use token 110 in additional requests for the protected resource 118. For example, the resource security API 116 may flag the single-use token 110 in the token data store 120 as having been used to access the protected resource 118.

As described earlier, a computing entity associated with an account included in the system 100 may be issued a single-use token 110 that allows the computing entity to request access to a protected resource 118 by sending an API request to the resource security API 116. The following example describes issuing a single-use token 110 to a computing entity (i.e., a virtualized compute resource 112 associated with an account).

As illustrated, the system 100 may include a computing provisioning service 106 configured to launch a virtualized compute resource 112 on a server 104b. A virtualized compute resource 112 may include a computing instance, a software container, or any other type of virtual computing device, resource, or operating system where a framework may be used to divide a computing resource into one or more execution environments. A computing instance may be an instance of a software implementation of a physical machine (i.e., a computer) configured to emulate the physical machine. A software container may be a computer program that performs operating-system-level virtualization to provide an isolated environment for executing program code (e.g., an application, process, or the like on an operating system) to execute. For example, operating system kernel functionality may be used to isolate computing resources and create separate namespaces in order to provide an isolated (containerized) user space for program code to execute. In doing so, the program code may be contained to the isolated user space, allowing multiple instances of containerized program code to utilize a single operating system kernel. A virtualized compute resource 112 may be launched to host an application 114 associated with a customer account. An application 114 may be any type of computer software, including, but not limited to: a program, process, script, program code function (e.g., a "serverless" function that receives parameters, performs processing, makes service requests, and/or provides return values), and the like.

As part of launching a virtualized compute resource 112 to host an application 114, the computing provisioning service 106 may be configured to provision a single-use token 110 to the virtualized compute resource 112. The single-use token 110 may allow the virtualized compute resource 112 (e.g., a process or application associated with or linked to a service provider account executing on the virtualized compute resource 112) to access a protected resource 118 associated with another account (e.g., a customer account). As an illustration, an application build process (shown in FIG. 2) executing on the virtualized compute resource 112 may use the single-use token 110 to obtain customer credentials and set environment variables with the customer credentials to allow the application 114 to reference the environment variables and access external application resources. As another illustration, the process may use the single-use token 110 to obtain a protected resource 118 (e.g., a protected URI) and provide the protected resource 118 to the application 114. In some examples, a protected resource 118 may be written to shared location or shared data store, such as a default directory file, a key-value data store, cached in memory, shared variables, or environment variables, from which the virtualized compute resource 112 may obtain the protected resource 118. As one example, the resource security API 116 may validate a single-use token 110 and write a protected resource 118 to a default directory file (not shown) or another file location which is accessible to the virtualized compute resource 112, and thereafter, the virtualized compute resource may access the default directory file and obtain the protected resource 118. As another example, the resource security API 116 may write a protected resource 118 to a key-value data store (not shown) and provide the virtualized compute resource 112 with a key-portion of a key-value pair, and the virtualized compute resource 112 may use the key-portion of the key-value pair to obtain the protected resource 118 from the key-value data store. In yet another example, the resource security API 116 may write a protected resource 118 to server memory space (volatile or non-volatile memory) which has been allocated for use by the virtualized compute resource 112 and the virtualized compute resource may access the server memory space to obtain the protected resource 118.

Alternatively, a single-use token 110 provided to a virtualized compute resource 112 may allow an application 114 associated with a customer account to access a protected resource 118 associated with another computing entity (e.g., a service provider account or a third-party account). For example, as part of launching the virtualized compute resource 112 to host the application 114, the single-use token 110 may be sent to or provisioned to the virtualized compute resource 112, and after initiating the application 114 on the virtualized compute resource 112, the application 114 may use the single-use token 110 to access a service provider resource, such as log file, data store, API (application programming interface), or managed service.

In one example, provisioning a single-use token 110 to a virtualized compute resource 112 may include sending a token request to the token service 108. The token request may include a resource identifier assigned to the virtualized compute resource 112. In response to receiving the request, the token service 108 may generate the single-use token 110 and link the single-use token 110 to the resource identifier included in the token request. The token service 108 may store the single-use token 110 to a token data store 120. Sometime thereafter, a request may be sent from the virtualized compute resource 112 to the resource security API 116 requesting access to a protected resource 118. The request may include the resource identifier assigned to the virtualized compute resource 112. In response to receiving the request, the resource security API 116 may query the token data store 120 for a single-use token 110 linked to the resource identifier assigned to the virtualized compute resource 112. Upon determining that the token data store 120 includes the single-use token 110 and describes the link between the single-use token 110 and the resource identifier, the resource security API 116 allows the virtualized compute resource 112 to access the protected resource 118. After allowing access to the protected resource 118, the resource security API 116 may disable the single-use token 110 (e.g., via deleting the single-use token 110 or flagging the single-use token 110 as having been used) to prevent additional requests associated with the virtualized compute resource 112 from accessing the protected resource 118.

In another example, provisioning a single-use token 110 to a virtualized compute resource 112 may include the virtualized compute resource 112 (or an application 114, process, or the like hosted on the virtualized compute resource 112) sending a request to the token service 108 for a single-use token 110, and providing the single-use token 110 returned by the token service 108 to the virtualized compute resource 112. As part of generating the single-use token 110, the token service 108 may register the single-use token 110 in the token data store 120 (e.g., a token registry managed by the token service 108. After provisioning the single-use token 110, the virtualized compute resource 112 (or the application 114) may send a request and the single-use token 110 to the resource security API 116 requesting access to a protected resource 118. In response to receiving the request, the resource security API 116 may validate the single-use token 110 by querying the token data store 120 to determine whether the single-use token 110 has been used. After successful validation of the single-use token 110, the resource security API 116 may provide access to the protected resource 118 and disable the single-use token 110 by updating the token data store 120 to indicate that the single-use token 110 has been used.

Figure 2:
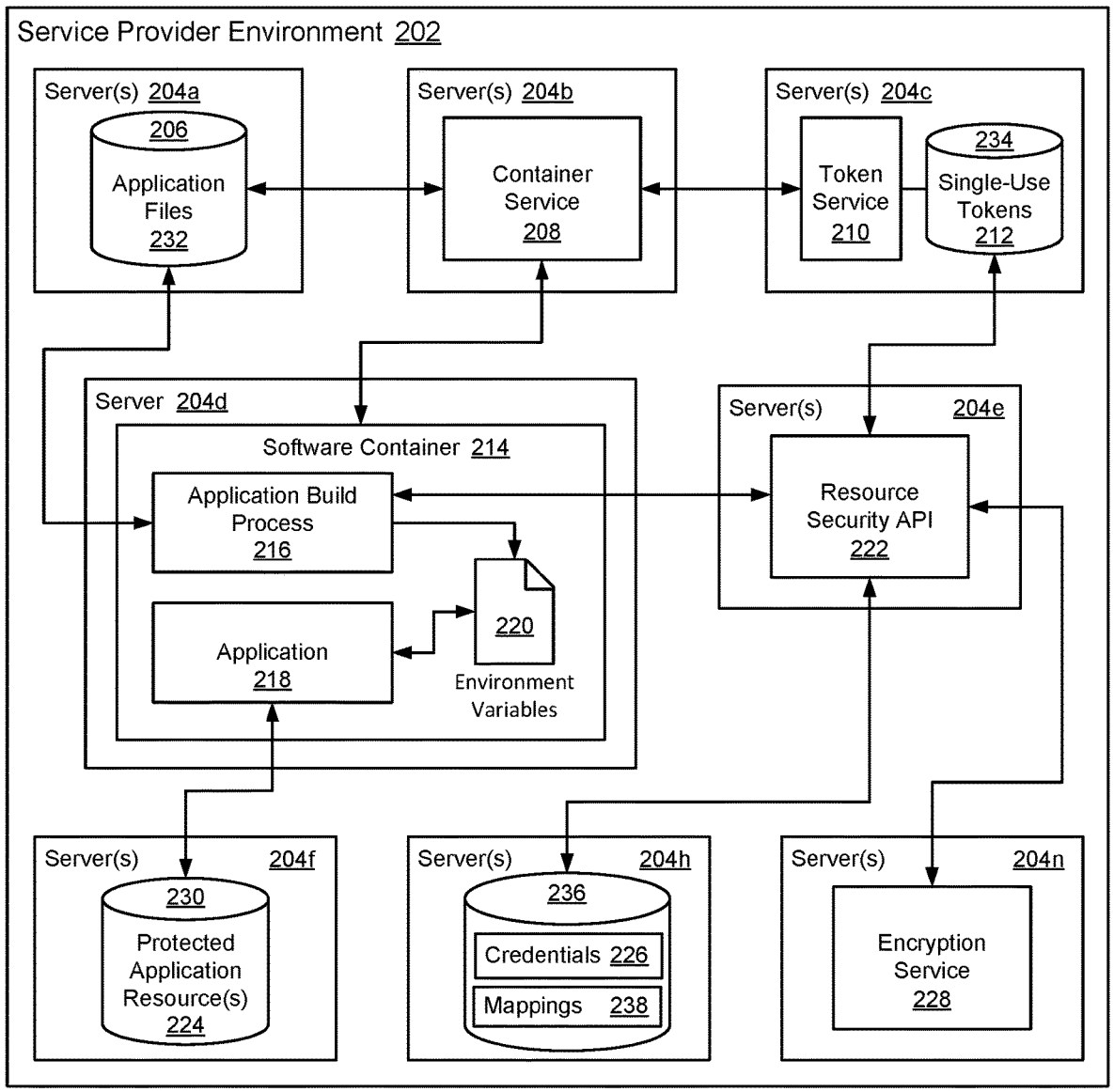
FIG. 2 is a block diagram that illustrates various example components included in a system for providing an application build process with one-time access to resource credentials associated with a customer account.

FIG. 2 illustrates components of an example system 200 on which the present technology may be executed. More specifically, as described in detail below, the system 200 may be configured to provide an application build process 216, associated with a service provider account, one-time access to resource credentials 226 associated with a customer account. Providing one-time access to the resource credentials 226 allows the application build process 216 to set environment variables 220 that contain the resource credentials 226 so that an application 218 associated with the customer account can reference the environment variables 220 and use the resource credentials 226 to access protected application resources 224 (e.g., databases, files, services, etc.).

As illustrated, the system 200 may include a service provider environment 202 having a number of servers 204a-n that are in network communication and host various components of the system 200. The components of the system 200 may include: a container service 208, a token service 210, a resource security API 222, an encryption service 228, and other components used to implement the system 200. The service provider environment 202 may support virtualization (described in more detail later in association with FIG. 6) which may be used to host a software container 214 on a server 204d. A software container 214 may be a computer program that executes on a server 204d to perform operating-system-level virtualization to provide an isolated environment for executing the application 218.

A service provider may offer computing resources located in the service provider environment 202 (e.g., one or more data centers) to host customer resources, including applications 218 and application resources (protected application resources 224). For example, customers may use service provider computing resources to host applications that include: virtual web stores, media outlets, social networking sites, and many other network accessible sites or services. A customer may upload application files 232 (e.g., executables, HTML files, CSS files, JavaScript files, etc.) for the customer's application 218 to an application file repository 206, and upload protected application resources 224 (e.g., databases, files, etc.) to one or more data stores 230, and thereafter, request that the application 218 be loaded on a software container 214 hosted on one or more servers 204d in the service provider environment 202.

The container service 208 may be configured to launch a software container 214 to host an application 218. As part of launching a software container 214 on a server 204d, the container service 208 may load an application build process 216 in the software container 214 and request a single-use token 212 that grants the application build process 216 a one-time access to the resource credentials 226. The application build process 216 may be associated with a service provider account that provides permissions for the application build process 216 to access unprotected resources (e.g., application files 232) which may be used to build the application 216. However, some resources, such as resource credentials 226 used by the application 218 to access protected application resources 224, may be associated with another account (e.g., a customer account), and therefore, may not be accessible to the application build process 216. The single-use token 212 allows the application build process 216 to request the resource credentials 226 from the resource security API 222.

In one example, the container service 208 sends a request for the single-use token 212 to the token service 210. The token service 210 may be a managed service configured to generate temporary, limited-privilege credentials for use by service provider entities (e.g., processes, services, applications, clients, and the like) associated with various accounts (e.g., service provider accounts, customer accounts, third-party accounts, etc.). In particular, the token service 210 may generate a single-use token 212 in response to a request from the container service 208. In one example, as described later in association with FIG. 3, the single-use token 212 may be generated and stored to a token data store 234. In another example, as described later in association with FIG. 4, the single-use token 212 may be generated and the single use-token 212 may be loaded into the software container 214.

After loading the application build process 216 into the software container 214 and requesting the single-use token 212, the application build process 216 may build the application 218. The application build process 216 may be configured to obtain application files 232 from the application file repository 206 and use the application files 232 to build the application 216 in the software container 214. As an illustration, the application files 232 may be used to build a web application for a virtual web store that is hosted in the service provider environment 202. In addition to building the application 218, the application build process 216 may configure environment variables 220 in the software container 214 to allow the application 218 to access various resources utilized by the application 218. An environment variable 220 may be a dynamically created, named value that is a part of a software container environment in which an application 218 executes. For example, an application 218 can query the value of an environment variable 220 to discover a storage location, user profile, directory structure, or other resources used by the application 218. Some resources used by an application 218, such as protected application resources 224, may be associated with a customer account, and as such, resource credentials 226 may be needed to access the protected application resources 224. In particular, environment variables 220 may need to be set to the resource credentials 226 in order to allow the application 218 to access protected application resources 224. Illustratively, protected application resources 224 may include, but are not limited to, data stores, data objects, files, logs, and the like.

The application build process 216 may be configured to obtain the resource credentials 226 by sending a request to the resource security API 222 requesting the resource credentials 226. In one example, the request may include the single-use token 212. In another example, a resource identifier assigned to the software container 214 may be used to identify the single-use token 212 in the token data store 234. The resource security API 222 may validate the single-use token 212 associated with the request and provide the application build process 216 with one-time access to the resource credentials 226, as described in greater detail in association with FIG. 3 and FIG. 4.

In some instances, the resource credentials 226 may be encrypted. The encryption service 228 may be a managed service configured to generate encryption keys and centrally manage the encryption keys on behalf of an account (e.g., service provider account or customer account). Also, the encryption service 228 may provide encryption services associated with encrypting and decrypting data submitted to the encryption service 228. The resource credentials 226 may be encrypted using an encryption key generated by the encryption service 228. In one example, after validating the single-use token 212, the resource security API 222 may be configured to obtain the encryption key used to encrypt the resource credentials 226 from the encryption service 228 and decrypt the resource credentials 226 using the encryption key. In another example, the resource security API 222 may be configured to obtain the resource credentials 226 in an encrypted form from a credentials data store 236 and send the resource credentials 226 to the encryption service 228 along with a request that the encryption service 228 decrypt the resource credentials 226 using the encryption key that was used to encrypt the resource credentials 226. The encryption service 228 may decrypt the resource credentials 226 using the encryption key and send the decrypted resource credentials 226 back to the resource security API.

After successful validation of the single-use token 212, the resource security API 222 may send the resource credentials 226 to the application build process 216. In response to receiving the resource credentials 226, the application build process 216 may set the environment variables 220 to the resource credentials 226. As an illustration, the resource credentials 226 may include a credential for querying a data store table and performing data store operations on the data store table. The application build process 216 may set an environment variable 220 associated with the data store table to the credential to allow the application 218 to reference the environment variable 220 and perform read/write operations to the data store table.

In one example, the resource security API 222 may return a mapping 238 that maps a set of resource credentials 226 to environment variables 220. For example, an API request may be a request for a set of resource credentials 226 and a mapping 238 specifying resource credential—environment variable relationships. The application build process 216 may use the mapping 238 to set the environment variables 220 to the resource credentials 226. In one example, a customer associated with the application 218 may provide customer defined mappings 238 that map the resource credentials 226 to customer defined environment variables 220. As an illustration, a customer may define an environment variable 220 for a pre-signed URL (e.g., a URL with an appended access key and signature as query parameters to a protected resource) and map the environment variable 220 to the pre-signed URL. Illustratively, the customer may map the environment variable 220 to the pre-signed URL using a key-value pair. A mapping 238 may be created and stored with the pre-signed URL in the credentials data store 236, and the mapping 238 may be provided with the pre-signed URL to the application build process 216. The application build process 216 may use the mapping 238 to set the customer defined environment variable to the pre-signed URL, allowing the application 218 to reference the environment variable 220 and use the pre-signed URL to access a resource identified in the pre-signed URL.

In another example, a key portion of a key-value pair (e.g., an already known field name or variable name) may be used by the application build process 216 to obtain resource credentials 226 for protected application resources 224. For example, as part of building the application 216, the application build process 216 may identify an environment variable 220 assigned an identifier that is a key portion of a key-value pair, and the application build process 216 may request a resource credential 226 from the resource security API 222 using the key portion of the key-value pair. In response, the resource security API 222 may use the key portion of the key-value pair to query the credentials data store 236 for the resource credential 226, wherein the resource credential 226 may be the value portion of the key-value pair. The resource security API 222 may return the resource credential 226 to the application build process 216, and the application build process 216 may then set the environment variable 220 to the resource credential 226.

After providing the application build process 216 with one-time access to the resource credentials 226, the single-use token 212 may be disabled or deleted, preventing additional requests from the application build process 216 from accessing the resource credentials 226 using the single-use token 212. For example, the single-use token 212 may be disabled by deleting the single-use token 212 from the token data store 234 or flagging the single-use token 212 in the token data store 234 as having been being used.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the services included in the service provider environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of web-based services.

A network may be utilized to interconnect the servers 204a-n. The network may include any useful computing network, including an intranet, the Internet, a local area network (LAN), a wide area network (WAN), a wireless data network, or any other such network or combination thereof. Components utilized for the network may depend at least in part upon the type of network and/or environment selected. Communication over the network may be enabled by wired or wireless connections and combinations thereof.

FIG. 2 illustrates that certain processing services may be discussed in connection with this technology and these services may be implemented using one or more processing modules. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
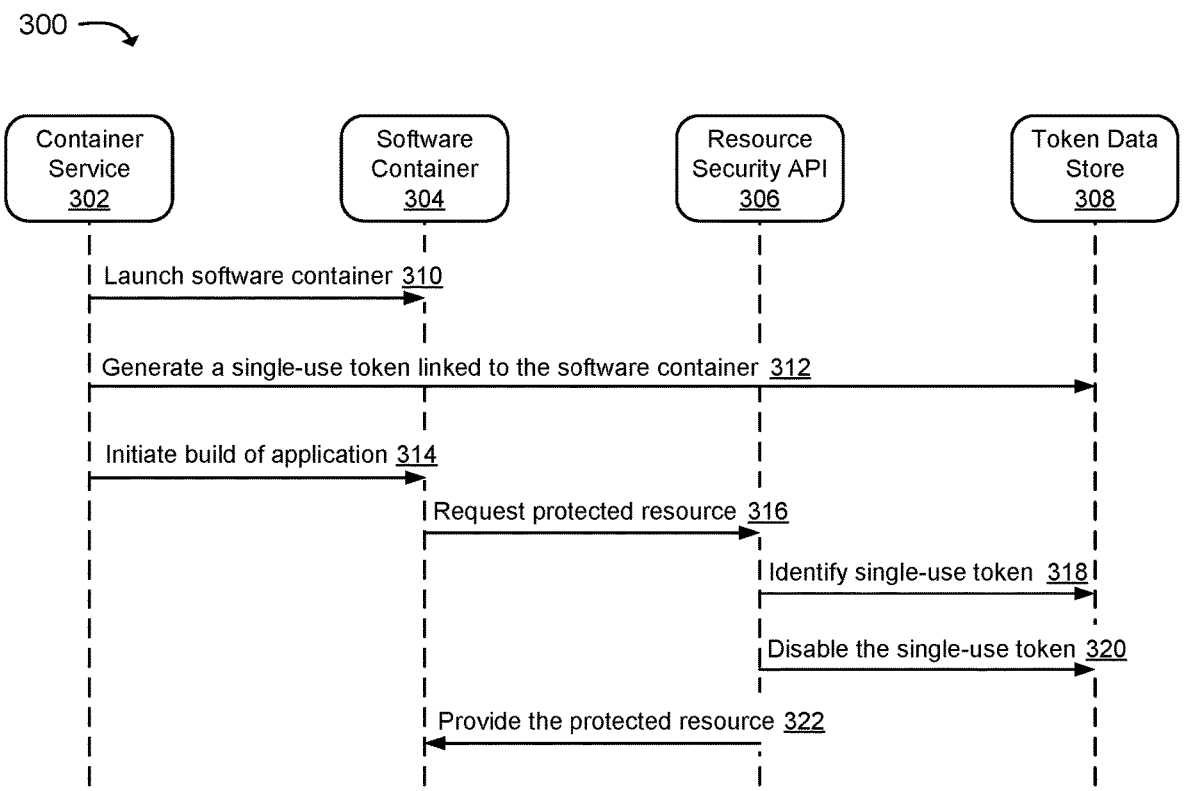
FIG. 3 is a sequence diagram that illustrates an example method for obtaining a protected resource using a single-use token as checked against a token data store.

FIG. 3 is a sequence diagram illustrating an example method 300 for obtaining a protected resource using a single-use token stored in a token data store 308. A container service 302 may launch 310 a software container 304 to host an application associated with a customer account. As described earlier, as part of launching the software container 304, a container service may request that a token service generate 312 a single-use token. The single-use token may be linked to the software container 304. For example, a resource identifier assigned to the software container 304 may be linked to the single-use token in a token data store 308. The resource identifier for the software container 304 may be used to validate the single-use token, as described below.

Also, in one example, customer account information associated with the application may be linked to the single-use token. For example, the single-use token may be generated to include a customer account number. The customer account information may be used to identify a protected resource, resource mappings, as well as other customer related information associated with the customer account.

In some examples, single-use tokens may be generated for individual customer accounts which have been granted rights to the software container 304. For example, cross-account access may be used to grant users having different customer accounts access to the application hosted in the container service 302. For example, access to a virtual web store application may be granted to an administrative account, item inventory account, and a marketing account. As part of setting up an execution environment for the application, protected resources for each customer account granted access to the application may be obtained using a single-use token generated for each customer account. For example, the single-use tokens may be used to obtain credentials for each customer account during a build of the virtual web store application to allow the application to access data stores associated with the individual customer accounts. As an illustration, during the build of the virtual web store application, an application build process may send individual API requests to the resource security API 306 requesting individual resource credentials for the customer accounts. In response to an individual request, the resource security API 306 may validate a single-use token associated with a customer account and provide the resource credentials associated with the customer account.

The container service 302 may initiate 314 the build of the application in the software container 304. For example, an application build process may be initiated under a service provider account. As part of building the application, a request 316 for the protected resource may be sent to a resource security API 306. The request may include the resource identifier for the software container 304. In response to receiving the request for the protected resource, the resource security API 306 may validate the single-use token by identifying 318 the single-use token in the token data store 308. The source of the single-use token may be checked using the resource identifier included in the request for the protected resource. For example, the resource security API 306 may query the token data store 308 with the resource identifier to determine whether the token data store contains a single-use token linked to the resource identifier.

If a single-use token linked to the resource identifier is identified in the token data store 308, then the resource security API 306 disables the single-use token and provides the protected resource. For example, the resource security API 306 may disable 320 the single-use token by sending an instruction to delete the single-use token to the token data store 308. As such, should another request for the protected resource be received from the software container 304, the request will be ignored because a single-use token linked to the software container will not exist in the token data store 308. In another example, the single-use token may be disabled by flagging the single-use token in the token data store 308 as having been used. Should another request for the protected resource be received from the software container 304, a query of the token data store 308 by the resource security API 306 will indicate that the single-use token has already been used and the request for the protected resource will be ignored. If the single-use token linked to the resource identifier is not identified in the token data store 308, then the resource security API 306 may ignore the request for the protected resource.

After disabling 320 the single-use token, the resource security API 306 may provide 322 the protected resource to the software container 304, or store the protected resource to a location (e.g., directory file, a data store, or memory cache) from which the software container (or application build process process) can obtain the protected resource. As an example, the resource security API 306 may send a protected resource (along with other customer account resources, such as mappings) to the application build process in the software container 304. Alternatively, the resource security API 306 may write data included in the request to the protected resource (e.g., a log file).

Figure 4:
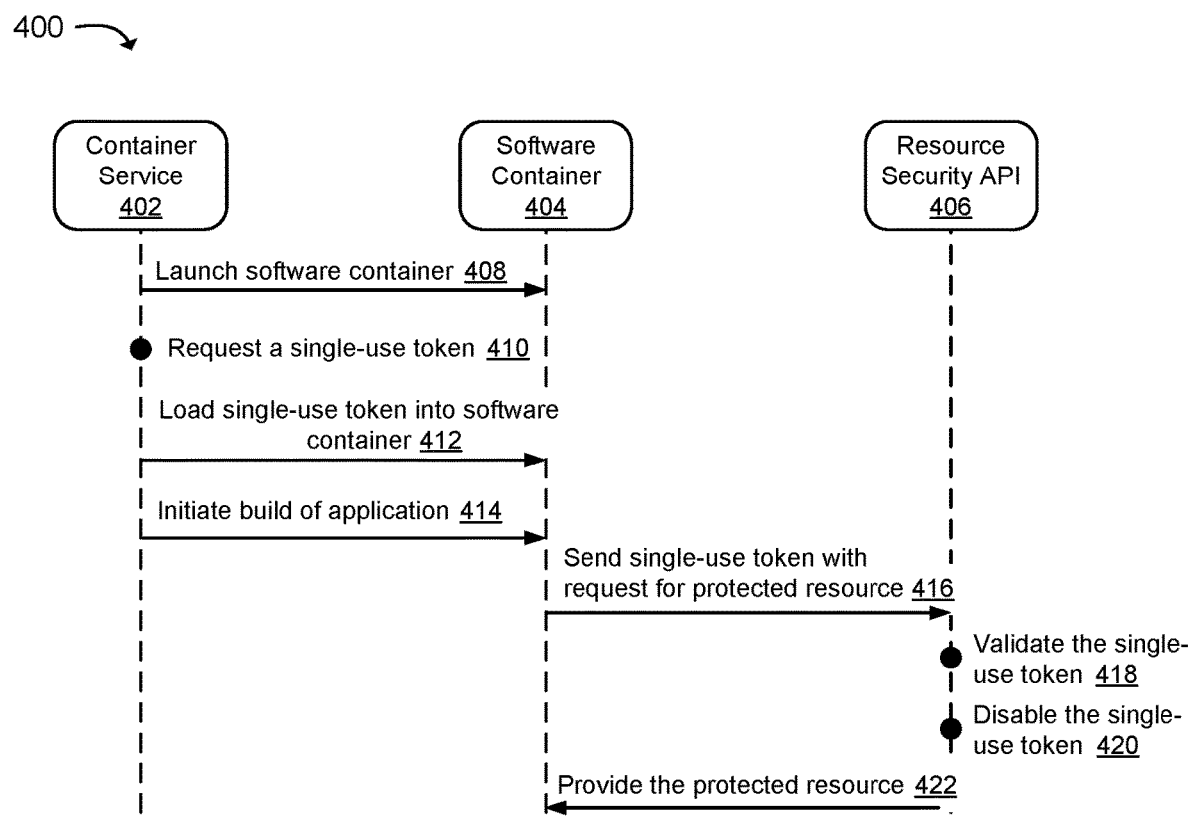
FIG. 4 is a sequence diagram illustrating an example method for obtaining a protected resource using a single-use token included in an API request.

FIG. 4 is a sequence diagram that illustrates an example method 400 for obtaining a protected resource using a single-use token included in an API request. As part of launching 408 a software container 404 to host an application, a container service 402 may generate 410 (or request generation of) a single-use token and load 412 the single-use token into the software container 404. For example, the container service 402 may send a request to a token service for a single-use token. The token service may be configured to generate the single-use token and provide the single-use token, or a reference (e.g., a URI) to the single-use token, to the container service 402. In one example, the single-use token may be generated to include a resource identifier for the software container 404, and/or an account number for a customer account, used to associate the single-use token with the software container 402 and/or customer account. In one example, the single-use token may be signed using asymmetric-key encryption.

The container service 402 may initiate 414 a build of the application in the software container 404. For example, the container service 402 may initiate an application build process to execute under a service provider account. As part of building the application, the application build process may send a request 416 for a protected resource associated with a customer account to a resource security API 406. The request may include the single-use token.

In response to receiving the request for the protected resource, the resource security API 406 may validate 418 the single-use token included in the request. In one example, the single-use token may be signed, and the resource security API 406 may validate the single-use token using asymmetric-key encryption. Also, the resource security API 406 may verify that the single-use token is associated with the software container 404 and/or the customer account. For example, the resource security API 406 may parse the single-use token to verify that a resource identifier included in the single-use token matches a resource identifier of the software container, and/or verify that customer account information included in the single-use token matches a customer account associated with the application in the software container 404. In one example, the single-use token may expire, such that if the single-use token is not used within a defined time period, the single-use token may become invalid and cannot be used to allow access to the protected resource. Accordingly, the resource security API 406 may validate that the single-use token has not expired.

After validating the single-use token, the resource security API 406 may disable the single-use token 420 to prevent additional requests associated with the software container 404 from accessing the protected resource. In one example, the resource security API 406 may add the single-use token to a token registry used to track single-use tokens that have been used to access a protected resource. As such, in response to any additional requests for the protected resource, a query of the token registry by the resource security API 406 may indicate that the single-use token has already been used and the request for the protected resource will be ignored. In an example where the single-use token is configured to expire, the single-use token may be disabled upon expiration of the single-use token. After disabling the single-use token 420, the resource security API 406 may provide 422 the protected resource to the application build process in the software container 404 (e.g., send the protected resource to the application build process, write the protected resource to a location accessible to the application build process, or write data included in the request to the protected resource). Alternatively, the token may be disabled or deleted after the protected resource has been sent to the software container 404.

Figure 5:
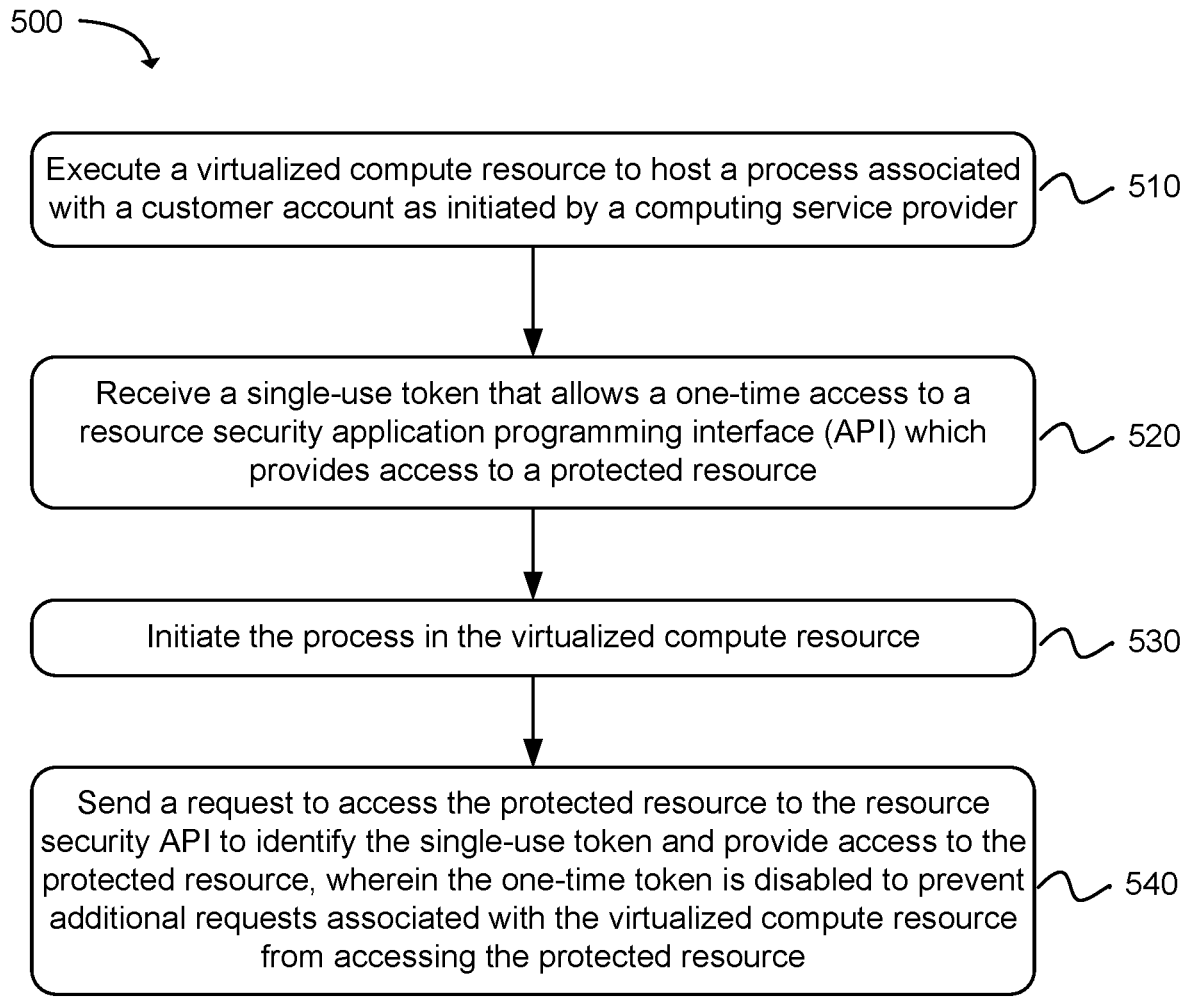
FIG. 5 is a flow diagram that illustrates an example method for providing one-time access to a protected resource via a resource security API and a single-use token.

FIG. 5 is a flow diagram that illustrates an example method 500 for providing one-time access to a protected resource via a resource security API and a single-use token. As in block 510, a virtualized compute resource may be executed to host a process associated with a customer account as initiated by a computing service provider. In one example, the virtualized compute resource may comprise a software container that provides an isolated environment for the process to execute. In another example, the virtualized compute resource may comprise a computing instance that hosts the process in a service provider environment, wherein the computing instance may be a software implementation of a physical machine configured to emulate the physical machine.

As in block 520, a single-use token may be received at the virtualized compute resource, where the single-use token allows a one-time access to a resource security API which provides access to a protected resource. In one example, a provisioning process that launched the virtualized compute resource may request the single-use token and the single-use token may be generated and stored to a token data store. In another example, the single-use token may be generated and loaded in the virtualized compute resource. Also, the single-use token may be generated to include a resource identifier assigned to the virtualized compute resource, such that validating the single-use token may include comparing the resource identifier included in or with the single-use token to a resource identifier included a request for a protected resource.

As in block 530, the process may be initiated in the virtualized compute resource. In one example, initiating the process in the virtualized compute resource may include loading the process in the virtualized compute resource and implementing an execution environment for the process to execute. As part of implementing the execution environment for the process, the protected resource may be obtained from the resource security API and an environment variable may be set to the protected resource, such that the process may reference the environment variable to obtain the protected resource.

As in block 540, a request to access the protected resource may be sent to the resource security API to identify the single-use token and provide access to the protected resource. In one example, the request to access the protected resource may include a request associated with a customer account to perform a one-time write of data to a service provider protected resource. In another example, the request to access the protected resource may include a request associated with a service provider account to access a customer protected resource. Thereafter, the one-time token may be disabled to prevent additional requests associated with the virtualized compute resource from accessing the protected resource.

In one example, in response to receiving the request for the protected resource, the resource security API identifies the single-use token in the token data store, validates the single-use token using in part a resource identifier included in the single-use token, provides access to the protected resource, and deletes the single-use token from the token data store. In another example, the single-use token may be included in the request for the protected resource, and the resource security API may validate the single-use token using in part a resource identifier included in the single-use token, provides access to the protected resource, and disables the single-use token by recording that the single-use token has been used.

Figure 6:
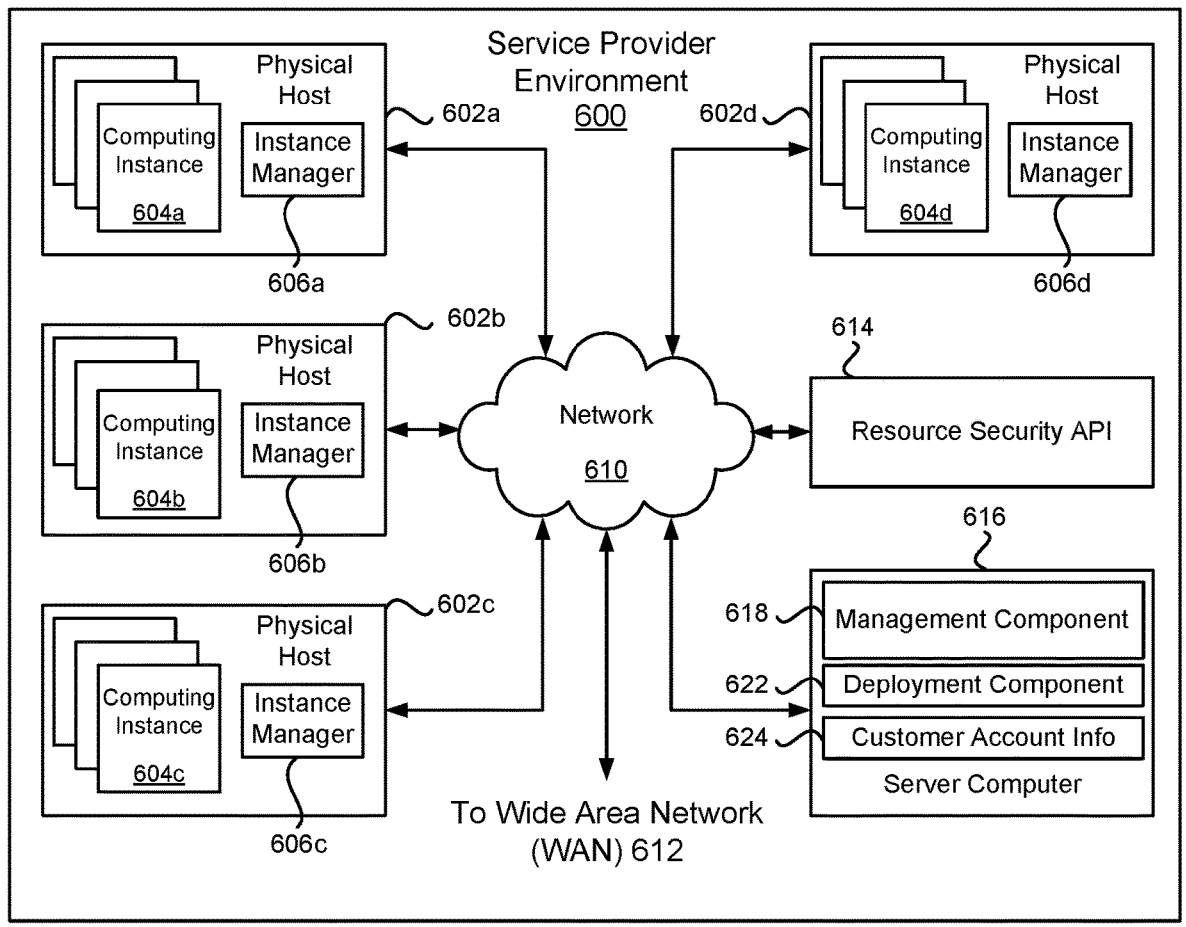
FIG. 6 is a block diagram that illustrates an example service provider environment that may be used to implement the technology described herein.

FIG. 6 is a block diagram illustrating an example service provider environment 600 that may be used to execute and manage a number of computing instances 604a-d. In particular, the service provider environment 600 depicted illustrates one environment in which the technology described herein may be used. The service provider environment 600 may be one type of environment that includes various virtualized service resources that may be used, for instance, to host computing instances 604a-d.

The service provider environment 600 may be capable of delivery of computing, storage and networking capacity as a software service. In one example, the service provider environment 600 may be established for an organization by or on behalf of the organization. That is, the service provider environment 600 may offer a "private cloud environment." In another example, the service provider environment 600 may support a multi-customer environment, wherein a plurality of customers may operate independently (i.e., a public cloud environment). Generally speaking, the service provider environment 600 may provide the following models: Infrastructure as a Service ("IaaS"), network-accessible system as a service, and/or Software as a Service ("SaaS"). Other models may be provided. For the IaaS model, the service provider environment 600 may offer computers as physical or virtual machines and other resources. The virtual machines may be run as guests by a hypervisor, as described further below. The network-accessible system as a service model delivers a computing system that may include an operating system, programming language execution environment, database, and web server.

Application developers may develop and run software solutions in the service provider environment 600 without incurring the cost of buying and managing the underlying hardware and software. The SaaS model allows installation and operation of application software in the service provider environment 600. End customers may access the service provider environment 600 using networked client devices, such as desktop computers, laptops, tablets, smartphones, etc. running web browsers or other lightweight client applications, for example. Those familiar with the art will recognize that the service provider environment 600 may be described as a "cloud" environment.

The particularly illustrated service provider environment 600 may include a plurality of server computers 602a-d. While four server computers are shown, any number may be used, and large data centers may include thousands of server computers. The service provider environment 600 may provide computing resources for executing computing instances 604a-d. Computing instances 604a-d may, for example, be virtual machines. A virtual machine may be an instance of a software implementation of a machine (i.e. a computer) that executes applications like a physical machine. In the example of a virtual machine, each of the server computers 602a-d may be configured to execute an instance manager 608a-d capable of executing the instances. The instance manager 608a-d may be a hypervisor, virtual machine monitor (VMM), or another type of program configured to enable the execution of multiple computing instances 604a-d on a single server. Additionally, each of the computing instances 604a-d may be configured to execute one or more applications.

One or more server computers 614 and 616 may be reserved to execute software components for managing the operation of the service provider environment 600 and the computing instances 604a-d. For example, a server computer 614 may execute the resource security API described earlier.

A server computer 616 may execute a management component 618. A customer may access the management component 618 to configure various aspects of the operation of the computing instances 604a-d purchased by a customer. For example, the customer may setup computing instances 604a-d and make changes to the configuration of the computing instances 604a-d.

A deployment component 622 may be used to assist customers in the deployment of computing instances 604a-d. The deployment component 622 may have access to account information associated with the computing instances 604a-d, such as the name of an owner of the account, credit card information, country of the owner, etc. The deployment component 622 may receive a configuration from a customer that includes data describing how computing instances 604a-d may be configured. For example, the configuration may include an operating system, provide one or more applications to be installed in computing instances 604a-d, provide scripts and/or other types of code to be executed for configuring computing instances 604a-d, provide cache logic specifying how an application cache should be prepared, and other types of information. The deployment component 622 may utilize the customer-provided configuration and cache logic to configure, prime, and launch computing instances 604a-d. The configuration, cache logic, and other information may be specified by a customer accessing the management component 618 or by providing this information directly to the deployment component 622.

Customer account information 624 may include any desired information associated with a customer of the multi-customer environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the service provider environment 600 and the server computers 602a-d, 616. The network 610 may be a local area network (LAN) and may be connected to a Wide Area Network (WAN) 612 or the Internet, so that end customers may access the service provider environment 600. The network topology illustrated in FIG. 6 has been simplified, many more networks and networking devices may be utilized to interconnect the various computing systems disclosed herein.

Figure 7:
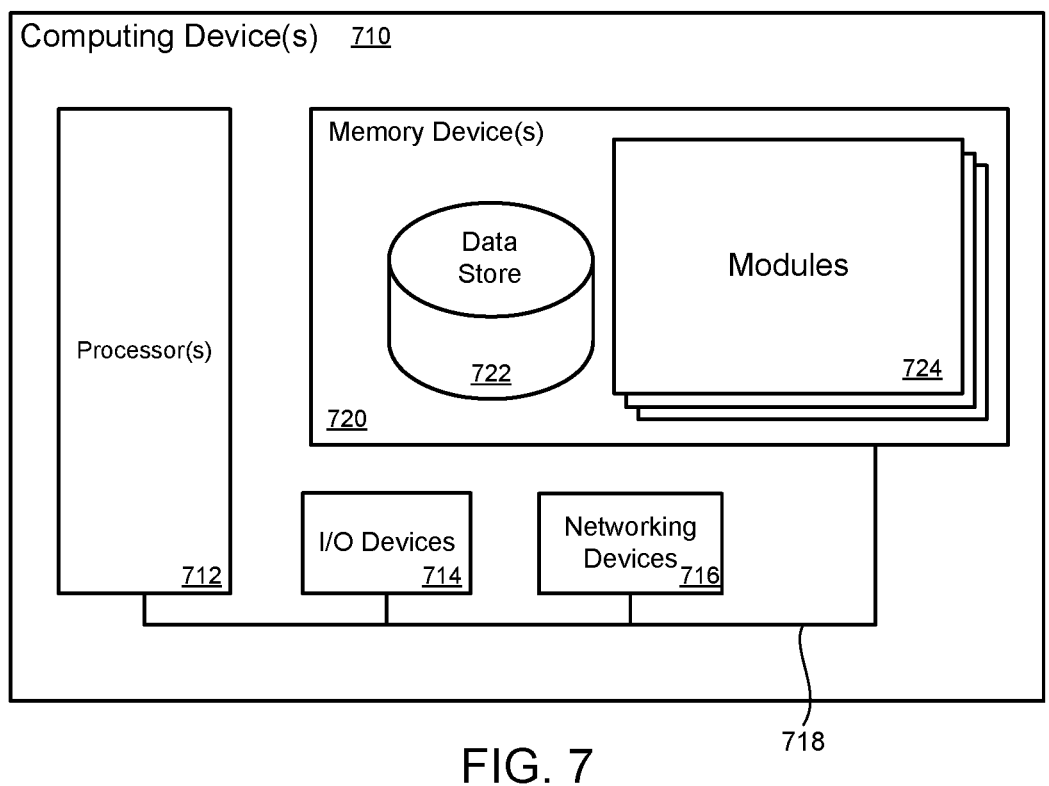
FIG. 7 is block diagram illustrating an example of a computing device that may be used to execute a method for providing one-time access to a protected resource.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. In one example, the modules 724 may include a resource security API module, container service module, token service module, encryption service module, and other modules. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high-level programming languages that are compiled, interpreted, or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, magnetic tape, or any other memory components.

The processor 712 may represent multiple processors and the memory device 720 may represent multiple memory units that operate in parallel to the processing circuits. This may provide parallel processing channels for the processes and data in the system. The local communication interface 718 may be used as a network to facilitate communication between any of the multiple processors and multiple memories. The local communication interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory, or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
   at least one processor;
   a memory device including instructions that, when executed by the at least one processor, cause the system to:
   receive a request to launch a software container in a service provider environment associated with a service provider account to host an application associated with a customer account different from the service provider account;
   initiate a launch of the software container, wherein the software container includes environment variables which are used by the application to access at least one application resource;
   generate a single-use token linked to the software container, wherein the single-use token allows one-time access to a resource security application programming interface (API) that provides credentials associated with the customer account for the at least one application resource; and
   initiate a build of the application in the software container, wherein a request for the credentials associated with the customer account is sent to the resource security API to validate the single-use token and obtain the credentials associated with the customer account, and after obtaining the credentials associated with the customer account, the single-use token is deleted to prevent additional requests associated with the software container from accessing the credentials associated with the customer account, and the environment variables in the software container are set to the credentials associated with the customer account to allow the application to access the at least one application resource.

2. The system as in claim 1, wherein the memory device includes instructions that, when executed by the at least one processor, cause the system to store the single-use token to a token data store, wherein in response to the request for the credentials associated with the customer account, the resource security API identifies the single-use token in the token data store, validates the single-use token, and deletes the single-use token from the token data store.

3. The system as in claim 1, wherein the memory device includes instructions that, when executed by the at least one processor, cause the system to load the single-use token in the software container, wherein the request for the credentials associated with the customer account includes the single-use token, and in response to the request for the credentials associated with the customer account, the resource security API validates the single-use token.

4. The system as in claim 1, wherein the memory device includes instructions that, when executed by the at least one processor, cause the system to generate the single-use token to include a resource identifier assigned to the software container, wherein validating the single-use token includes comparing the resource identifier included in the single-use token to a resource identifier included in the request for the credentials associated with the customer account.

5. A computer implemented method, comprising:
   receiving a request to launch a virtualized compute resource to host a process associated with a customer account;
   launching the virtualized compute resource to host the process as initiated by a computing service provider;
   requesting a single-use token that allows a one-time access to a resource security application programming interface (API) providing access to a protected resource; and
   initiating the process in the virtualized compute resource, wherein a request to access the protected resource is sent to the resource security API, by the process, which validates the single-use token and provides access to the protected resource and disables the single-use token to prevent additional requests associated with the virtualized compute resource from accessing the protected resource, wherein the request to access the protected resource further comprises one of:
   a request associated with a customer account to perform a one-time write of data to a protected resource associated with a service provider account different from the customer account; or
   a request associated with the service provider account to access a protected resource associated with the customer account different from the service provider account.

6. The method as in claim 5, wherein the virtualized compute resource further comprises a software container that provides an isolated environment for the process to execute or a computing instance that hosts the process in a service provider environment, wherein the computing instance is a software implementation of a physical machine configured to emulate the physical machine.

7. The method as in claim 5, wherein initiating the process in the virtualized compute resource further comprises:
loading a build process in the virtualized compute resource, wherein the build process is associated with a service provider account; and
initiating the build process to set up an execution environment for the process and launch the process in the virtualized compute resource, wherein the build process obtains the protected resource from the resource security API for use in the execution environment.

8. The method as in claim 5, wherein the protected resource associated with the service provider account comprises a log file or a database.

9. The method as in claim 5, wherein the protected resource associated with the customer account comprises protected customer credentials.

10. The method as in claim 5, wherein the request associated with the service provider account to access the customer protected resource further comprises:
sending a request to the resource security API requesting the customer protected resource;
receiving the customer protected resource and a map that maps the customer protected resource to an environment variable; and
setting the environment variable to the customer protected resource, allowing the process to reference the environment variable and obtain the customer protected resource.

11. The method as in claim 5, wherein initiating the process in the virtualized compute resource further includes:
identifying a customer defined environment variable to be included in the virtualized compute resource that allows the process to reference the customer defined environment variable and obtain the customer protected resource;
sending a request to the resource security API requesting a value of the customer defined environment variable using a key portion of a key-value pair; and
setting the customer defined environment variable to a value portion of the key-value pair returned by the resource security API, allowing the process to reference the customer defined environment variable and obtain the customer protected resource.

12. The method as in claim 5, further comprising providing a user interface to allow a service provider customer to define a customer defined environment variable and provide a key-value pair that maps to the customer defined environment variable.

13. The method as in claim 5, further comprising:
generating the single-use token to include a resource identifier assigned to the virtualized compute resource; and
storing the single-use token in a token data store, wherein in response to the request to access the protected resource, the resource security API further:
identifies the single-use token in the token data store;
validates the single-use token using in part the resource identifier included in the single-use token; and
deletes the single-use token from the token data store.

14. The method as in claim 13, wherein generating the single-use token further comprises:
generating the single-use token to include customer account information that is used to identify the protected resource associated with a customer account; and
sending the single-use token to the resource security API with the request for the protected resource.

15. The method as in claim 13, wherein generating the single-use token further comprises generating a single-use token for individual customer accounts that have been granted rights to the virtualized compute resource to allow cross account access to the protected resource.

16. A non-transitory machine readable storage medium, including instructions embodied thereon for a resource security application programming interface (API), the instructions when executed by one or more processors cause the one or more processors to:
receive a request for a protected resource, wherein the request is associated with a launch of a software container in a service provider environment, and the software container is launched to host a process associated with a customer account and is configured to use the protected resource, and wherein the request for the protected resource further comprises one of:
a request associated with the customer account to perform a one-time write of data to a protected resource associated with a service provider account different from the customer account; or
a request associated with the service provider account to access a protected resource associated with the customer account different from the service provider account;
identify a single-use token linked to the software container, wherein the single-use token allows the resource security API to provide the protected resource in response to the request;
send the protected resource to the software container in response to the request when the single-use token is identified; and
disable the single-use token linked to the software container to prevent additional requests associated with the software container from accessing the protected resource.

17. The non-transitory machine readable storage medium in claim 16, further comprising instructions that when executed by the one or more processors cause the one or more processors to:
obtain an encryption key used to encrypt the protected resource from a managed encryption service configured to centrally manage the encryption key; and
decrypt the protected resource using the encryption key.

18. The non-transitory machine readable storage medium in claim 16, wherein the single-use token is stored in a token data store accessible to the resource security API.

19. The non-transitory machine readable storage medium in claim 16, wherein the request for the protected resource includes customer account information that is used to identify the protected resource.

20. A computer implemented method, comprising:
receiving a single-use token that allows a one-time access to a resource security application programming interface (API) providing access to a protected resource;
initiating a process in a virtualized compute resource associated with a customer account as initiated by a computing service provider;
sending a request to access the protected resource to the resource security API with the single-use token, wherein the request to access the protected resource comprises one of:
a request associated with the customer account to perform a one-time write of data to a protected resource associated with a service provider account different from the customer account; or a request associated with the service provider account to access a protected resource associated with the customer account different from the service provider account; and receiving access to the protected resource, wherein the single-use token is disabled to prevent additional requests associated with the virtualized compute resource from accessing the protected resource.

21. The method in claim 20, further comprising launching the virtualized compute resource to host the process associated with the customer account as initiated by the computing service provider.

\* \* \* \* \*